US011840401B2

(12) United States Patent
Betancur Rivera et al.

(10) Patent No.: US 11,840,401 B2
(45) Date of Patent: Dec. 12, 2023

(54) PLATE CHAIN WITH SELF-SUPPORTED MECHANISM

(71) Applicant: FORJAS BOLIVAR S.A.S., Medellín (CO)

(72) Inventors: Álvaro de Jesús Betancur Rivera, Medellín (CO); Daniel Muñoz Hernández, Copacabana (CO); Gustavo Adolfo Urueña Orozco, Medellín (CO); Javier Humberto Toro Rios, Itagüí (CO); Juan Sebastian Rivera Betancur, Bello (CO); Sebastian Deossa Restrepo, Medellín (CO)

(73) Assignee: FORJAS BOLIVAR S.A.S., Medellín (CO)

( * ) Notice: Subject to any disclaimer, the term of this patent is extended or adjusted under 35 U.S.C. 154(b) by 0 days.

(21) Appl. No.: 17/729,030

(22) Filed: Apr. 26, 2022

(65) Prior Publication Data
US 2023/0028067 A1    Jan. 26, 2023

(30) Foreign Application Priority Data

Jul. 21, 2021    (CO) .......................... NC2021/0009472

(51) Int. Cl.
*B65G 17/08*  (2006.01)
*B65G 17/40*  (2006.01)
*B65G 17/06*  (2006.01)
*B65G 17/38*  (2006.01)

(52) U.S. Cl.
CPC ............. *B65G 17/08* (2013.01); *B65G 17/06* (2013.01); *B65G 17/40* (2013.01); *B65G 17/38* (2013.01)

(58) Field of Classification Search
CPC ........ B65G 17/08; B65G 17/06; B65G 17/40; B65G 17/38
USPC .................................................... 198/850, 851
See application file for complete search history.

(56) References Cited

U.S. PATENT DOCUMENTS 694,533 A * 4/1902 Cross .................... B65G 17/40
                                                    198/850
1,826,351 A * 10/1931 Hoefen .................. B65G 17/38
                                                    198/853
3,214,008 A * 10/1965 Warrick ................. B65G 17/42
                                                    198/845

(Continued)

FOREIGN PATENT DOCUMENTS

CN    103359596 A    10/2013
CN    104717108 B    4/2018

(Continued)

*Primary Examiner* — James R Bidwell
(74) *Attorney, Agent, or Firm* — Schmeiser, Olsen & Watts, LLP

(57) ABSTRACT

The technical field of engineering chains, specifically chains for the transport of raw material is provided, which purpose is to reduce the number of moving parts usually used in engineering chains with outboard wheels, without sacrificing optimal performance. To this end, it provides a straight plate chain mechanism with external and internal pitch, with a ratchet mechanism between the pitches, making the chain self-supporting and allowing it to only rotate in the internal direction when it has direct interaction with the sprocket, thus considerably reducing the possible catenaries.

13 Claims, 10 Drawing Sheets

(56) References Cited

U.S. PATENT DOCUMENTS

| | | | | | |
|---|---|---|---|---|---|
| 5,267,909 | A | * | 12/1993 | Iacchetta | F16G 13/18 |
| | | | | | 474/209 |
| 6,607,064 | B2 | * | 8/2003 | Inoue | B66B 23/12 |
| | | | | | 198/324 |
| 7,490,715 | B2 | * | 2/2009 | Girg | B21L 9/08 |
| | | | | | 59/5 |
| 8,371,436 | B2 | * | 2/2013 | Cornelissen | B65G 17/08 |
| | | | | | 198/853 |
| 2018/0017131 | A1 | | 1/2018 | Fukumori | |

FOREIGN PATENT DOCUMENTS

| | | | | | |
|---|---|---|---|---|---|
| DE | 102011003198 | A1 | | 8/2012 | |
| DE | 102021106748 | | * | 9/2022 | B65G 17/38 |
| EP | 545398 | | * | 6/1993 | B65G 39/20 |
| EP | 1744079 | A1 | | 1/2007 | |
| EP | 2280187 | A1 | | 2/2011 | |
| EP | 2331445 | | * | 8/2017 | B66B 21/10 |

* cited by examiner

PLATE CHAIN WITH SELF-SUPPORTED MECHANISM

CROSS-REFERENCE TO RELATED APPLICATIONS

This application claims priority to Colombian Application No. NC2021/0009472, having a filing date of Jul. 21, 2021, the entire contents of which are hereby incorporated by reference.

FIELD OF TECHNOLOGY

The following is related to the technical field of engineering chains, specifically chains for the transport of raw material, which purpose is to reduce the number of moving parts usually used in engineering chains with outboard wheels, without sacrificing optimal performance. To this end, the following provides a straight plate chain mechanism with external and internal pitch, with a ratchet mechanism between the pitches, making the chain self-supporting and allowing it to only rotate in the internal direction when it has direct interaction with the sprocket, thus considerably reducing the possible catenaries.

With the implementation of this self-supporting mechanism and the use of materials with high creep limits, it is possible to eliminate the support wheel every two or three steps, positively impacting the reduction of production costs, reduction of maintenance costs of movable elements in the plant, reduction of equipment weight and energy consumption, all this without sacrificing its resistance or its useful life.

BACKGROUND

Engineered chains encompass a wide range of chains designed to meet the most demanding needs of the industry. These are large-format elements that allow power to be transferred between components of industrial equipment such as elevators, conveyors, and transmission systems.

They are classified by their construction or materials used, such as roller and non-roller steel, welded, forged, cast, special application combination, and drive chains.

One of the engineering chains that is most affected by the environment and working conditions is the chain for the transport of organic materials, due to the high levels of humidity, the bagasse, and impurities present therein it (stones, dirt, among others). These chains usually include an outboard wheel system in each of their links that allows the system to be guided by rails so that the general body of the chain or the plates are not affected by wear due to direct contact with transport surfaces and, also, to support great loads.

Thus, in the state of the art, there is a plurality of disclosures related to engineering chains for the transport of different products, among which is document CN 103359596 A which discloses a pedal chain for a transport system, which comprises chain links, chain link shafts connecting adjacent chain links, and rollers mounted on the chain-link shafts, wherein the rollers are load-bearing support rollers; support rollers are mounted on the inner sides of the chain links; and every two adjacent support rollers are separated by at least two chain links. With the adoption of the technical scheme, the cost of the equipment is significantly reduced due to the smaller number of rollers; furthermore, since only the support rollers are in frictional contact with the flange parts of the guide rails, the frictional performance is significantly improved; and the silent operation performance is improved. Moreover, a compact structure of a wheel chain transmission mechanism is ensured, since support rollers are arranged on the inner sides of the chain links.

However, document CN 103359596 A has the disadvantage of not disclosing a ratchet mechanism, which provides the chain with the quality of being self-supporting.

On the other hand, document EP2280187A1 discloses a chain (1) comprising link plates (L,L0,L1,L2,L3) having two hinge pins with hinge rotation axes (A,B, C,D,H,32) for attachment to next or previous inner or outer link plates, successive link plates being able to rotate about successive hinge axes of rotation, wherein, when the center lines of the successive link plates form a common centerline, the most forward link plate forms a first angle ($\alpha 1$) with the common centerline (s) and a following first link plate forms a second angle ($\alpha 2$) with the common centerline (3).

However, the present document has the disadvantage of not mentioning outboard wheel mechanisms.

On the other hand, there is document EP1744079A1, where the chain has chain links (2, 3) connected by a chain joint, where each joint has a pivot pin extending into a pivot opening. Each of the two links has a reinforcing edge that comes into contact with the links on the front side in a running direction of the chain. One of the edges on one of the front sides has a recess, and the other edge on the other front side has a projection that fits into the recess. An offset of the links in a longitudinal direction of the opening is designed as a slotted hole, and the recess and protrusion are designed as a plug receptacle and a plug tongue, respectively. Also included is an independent claim for a rear rigid chain drive for driving an automated door or gate with a rear rigid chain.

However, the present document has the disadvantage of not mentioning outboard wheel mechanisms.

Document DE102011003198A1 refers to a drive chain (1) for a container cleaning machine with several chain links (4) connected to each other by pins (5) and articulated in a row, as well as with rollers (2) rotatably mounted on the studs. The drive chain rollers are arranged outside the interconnected chain links and fixed to the pin by a clamping device (3) in such a way that the individual rollers can be replaced independently of each other.

However, it is noted that document DE102011003198A1 has the disadvantage of providing an outboard wheel at each step and not mentioning a self-supporting mechanism.

Finally, document US20180017131A1 provides a link plate for a bicycle chain basically provided with a first link end portion, a second link end portion and an intermediate link portion interconnecting the first link end portion and the second link end portion. The first link end portion includes a first link opening having a first central link axis. The second link end portion includes a second link opening having a second link center axis parallel to the first link center axis. The link plate has a link longitudinal center line defining a longitudinal direction. The first link end portion has a first extended edge portion extending away from the second link end portion in the longitudinal direction or the intermediate link portion has an axial protrusion protruding from an inner surface thereof in the axial direction.

However, this document does not disclose chains with outboard wheels or straight plates.

SUMMARY

An aspect relates to an engineering chain for the transport of organic materials that is highly resistant while allowing the number of moving elements to be reduced, in order to reduce costs and production times, reduce maintenance costs and supplies, while ensuring the technical load requirements, providing an efficient self-supporting mechanism that is easy to manufacture.

BRIEF DESCRIPTION

Some of the embodiments will be described in detail, with references to the following Figures, wherein like designations denote like members, wherein:

FIG. 1 shows an application with multiple sections of plate chain with a self-supporting mechanism, a transport with lateral containment plates and a traction sprocket. The chain can rotate freely in the internal transport direction, that is, when the chain must rotate on the traction sprockets, the external chain links do not have any kind of interference to exert this rotation, on the contrary, the chain, before entering the traction sprocket and after leaving the traction sprocket, avoids the catenary due to the stops welded to the internal chain plates and to the locking geometry made in the external link plates;

Figure 1:
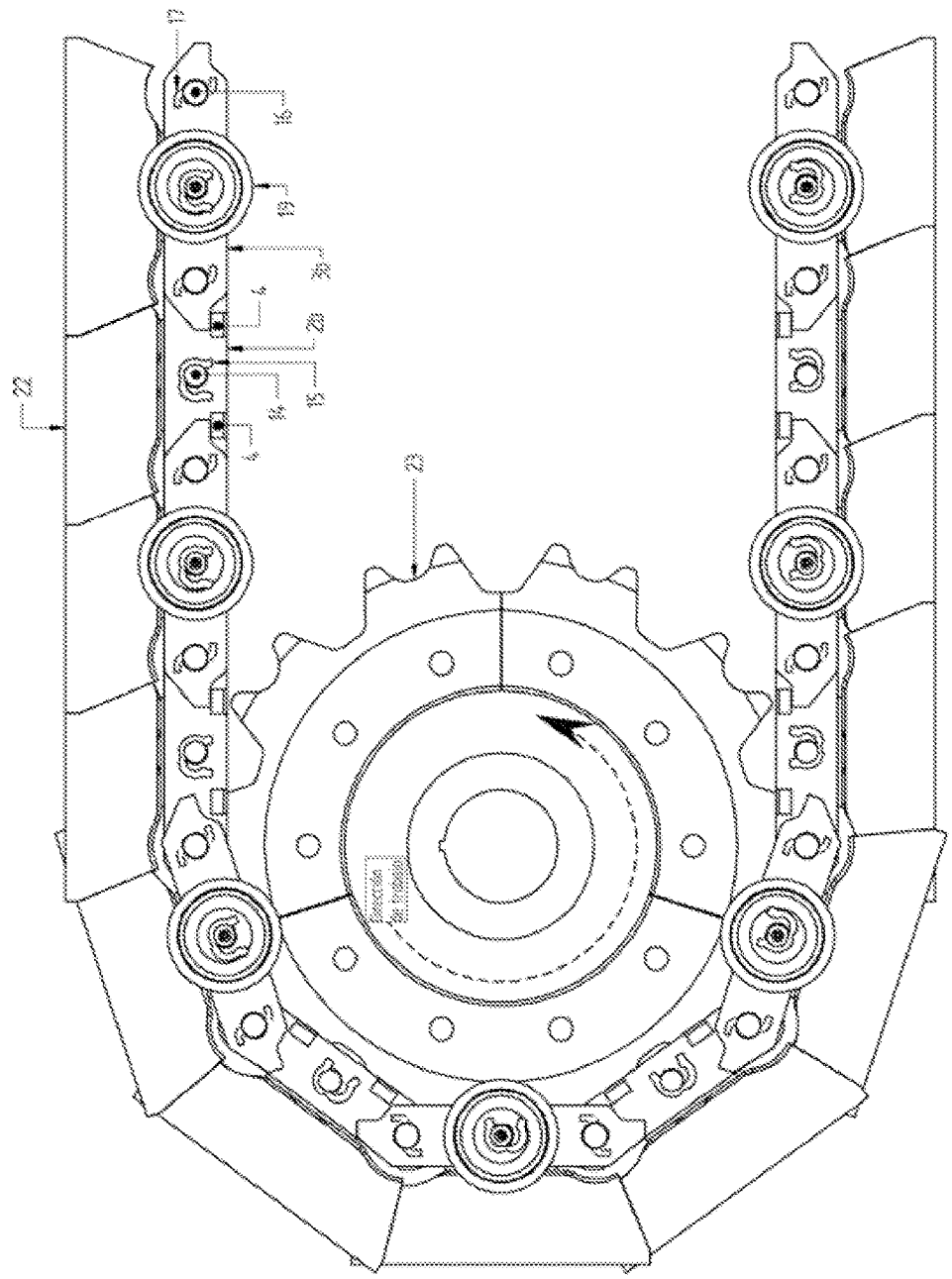
Figure 2:
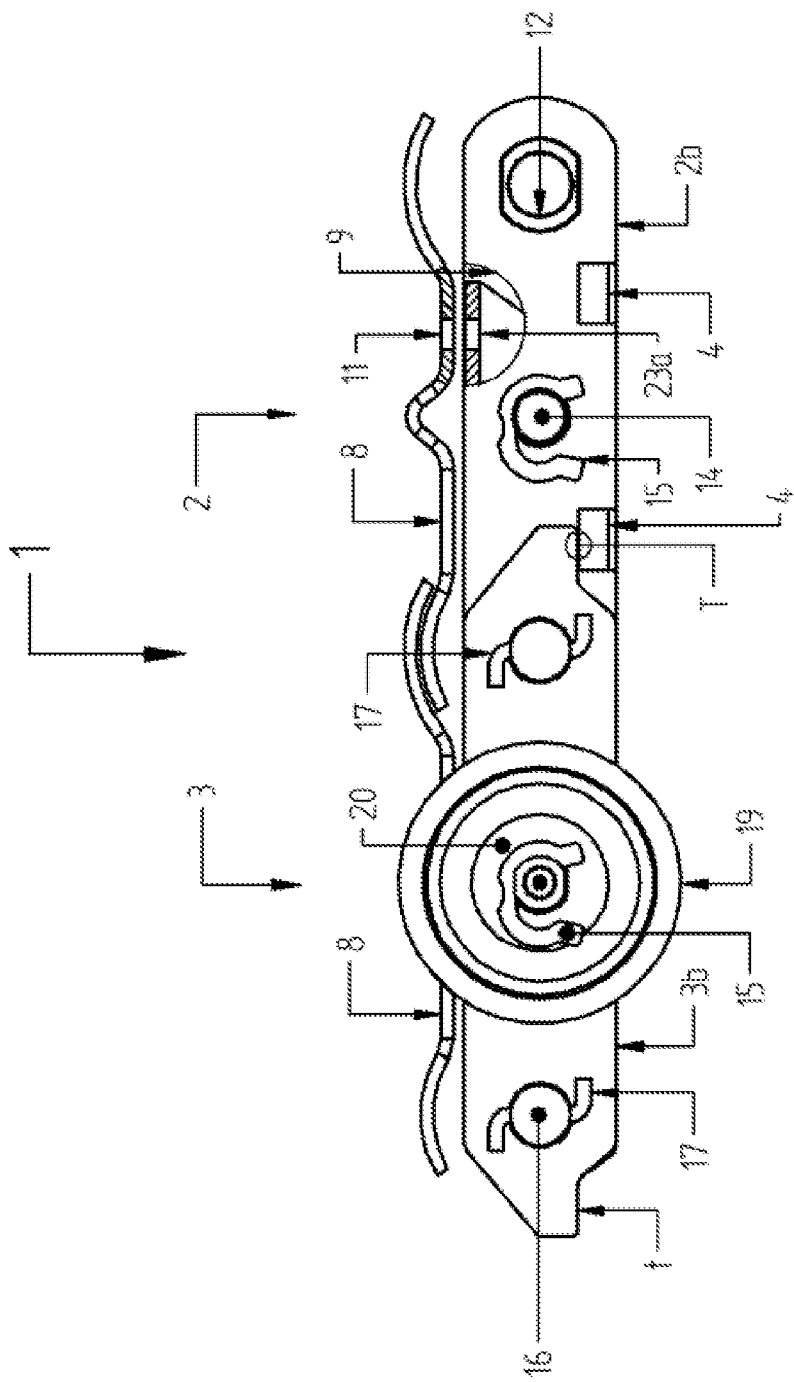
FIG. 2 shows a transport where a slat or slat floor is shown comprising a mounting section with a connecting element having an alignment component on the chain link inner. In addition, it shows the locking point between the welded block-type support and the external link plates.
Figure 3:
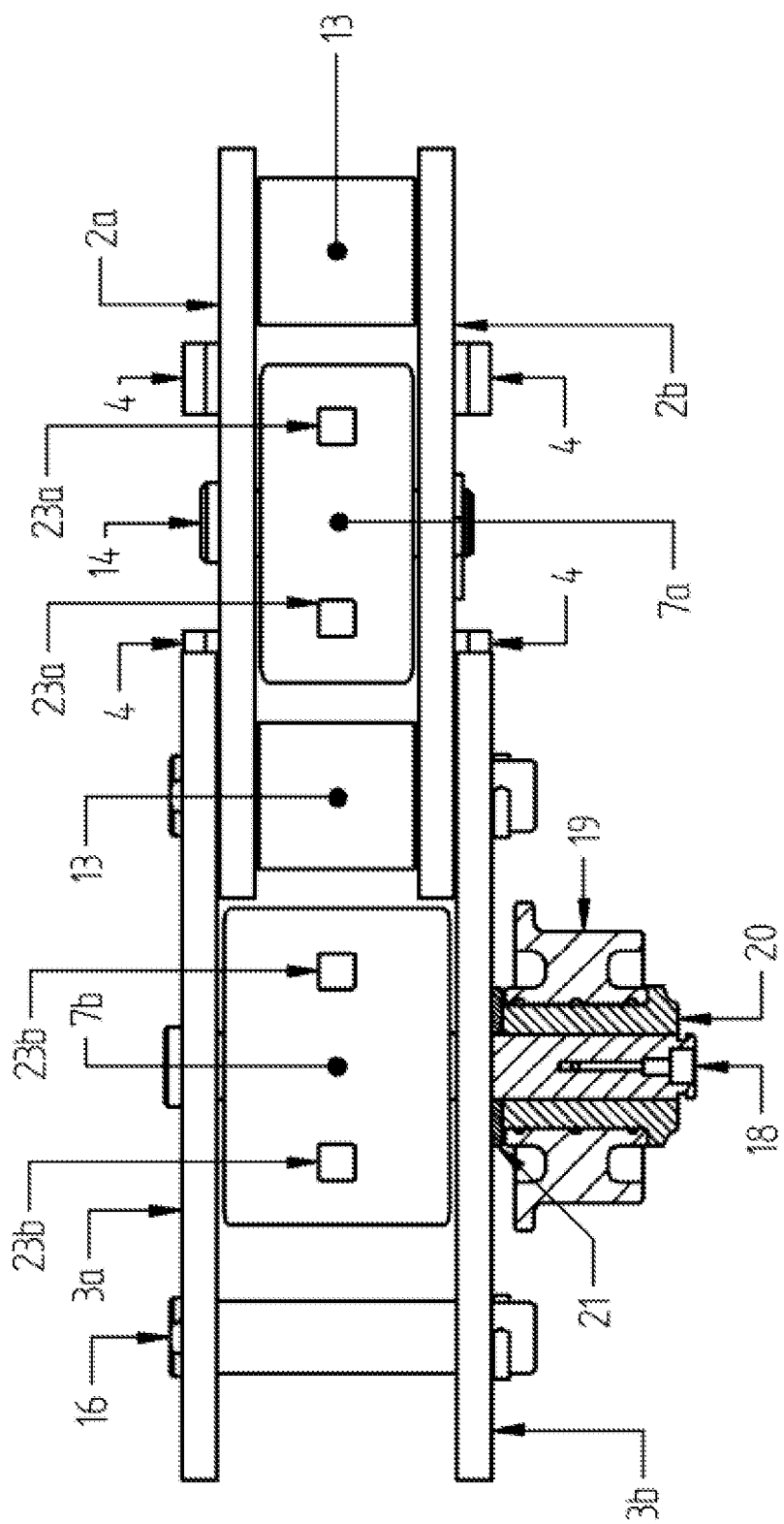
FIG. 3 shows a top view of the plate chain with self-supporting mechanism, evidencing the arrangement of the outboard wheel, the forged hub and the separation washer, in addition to show the location of the supports on the bent plate.
Figure 4:
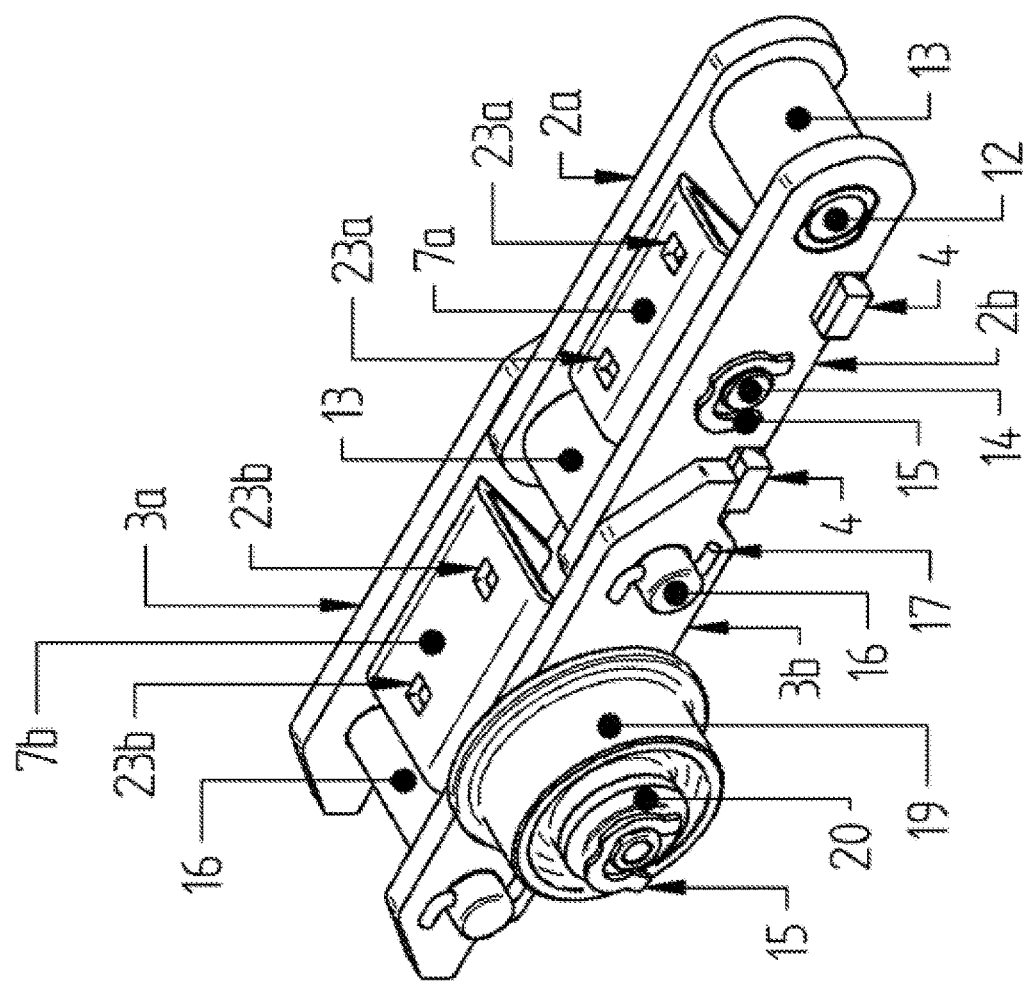
FIG. 4 shows a perspective illustration of the two links that make up the plate chain with a self-supporting mechanism.
Figure 5:
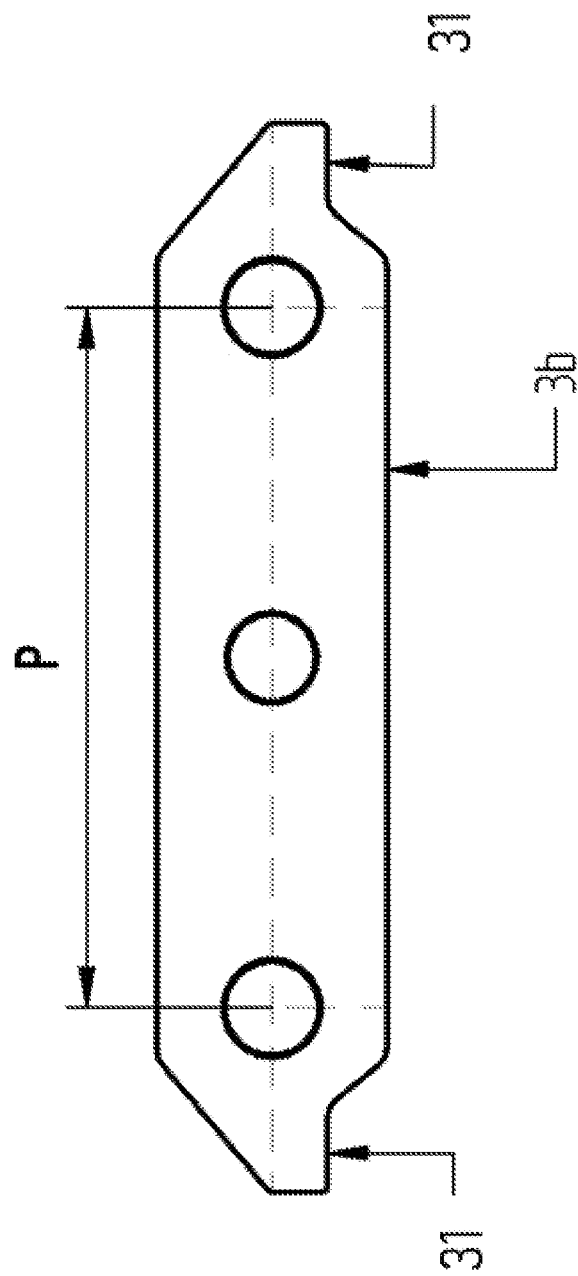
FIG. 5 shows the geometry of the second external link plate which is made up of a step and the locking geometry.
Figure 6:
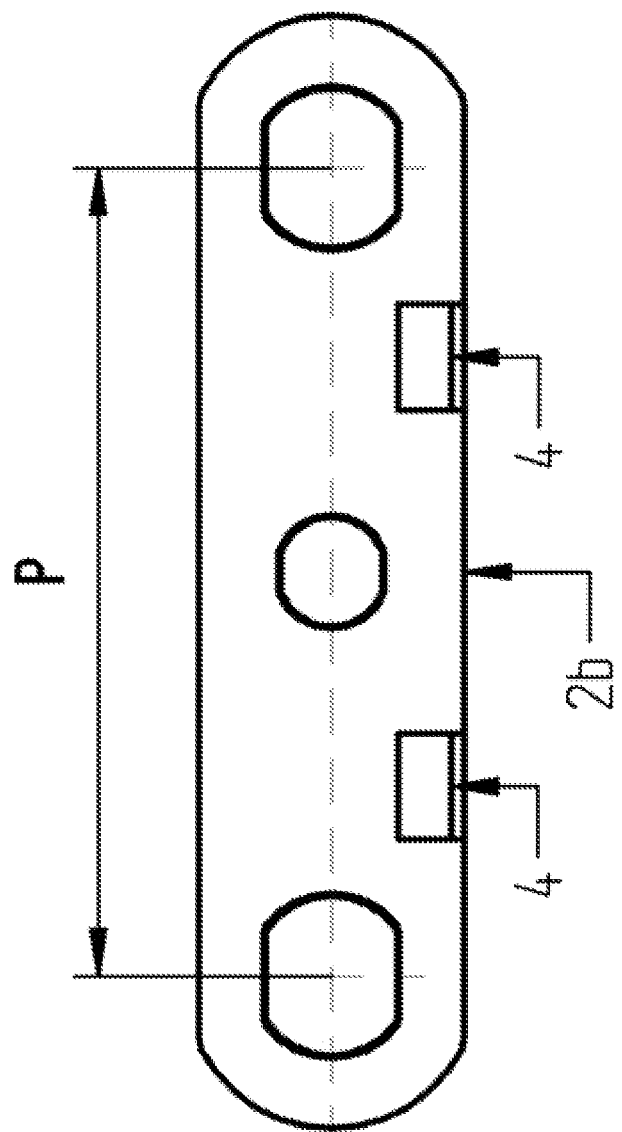
FIG. 6 shows the assembly between the second internal link plate with defined pitch and the block-type welded stops.
Figure 7:
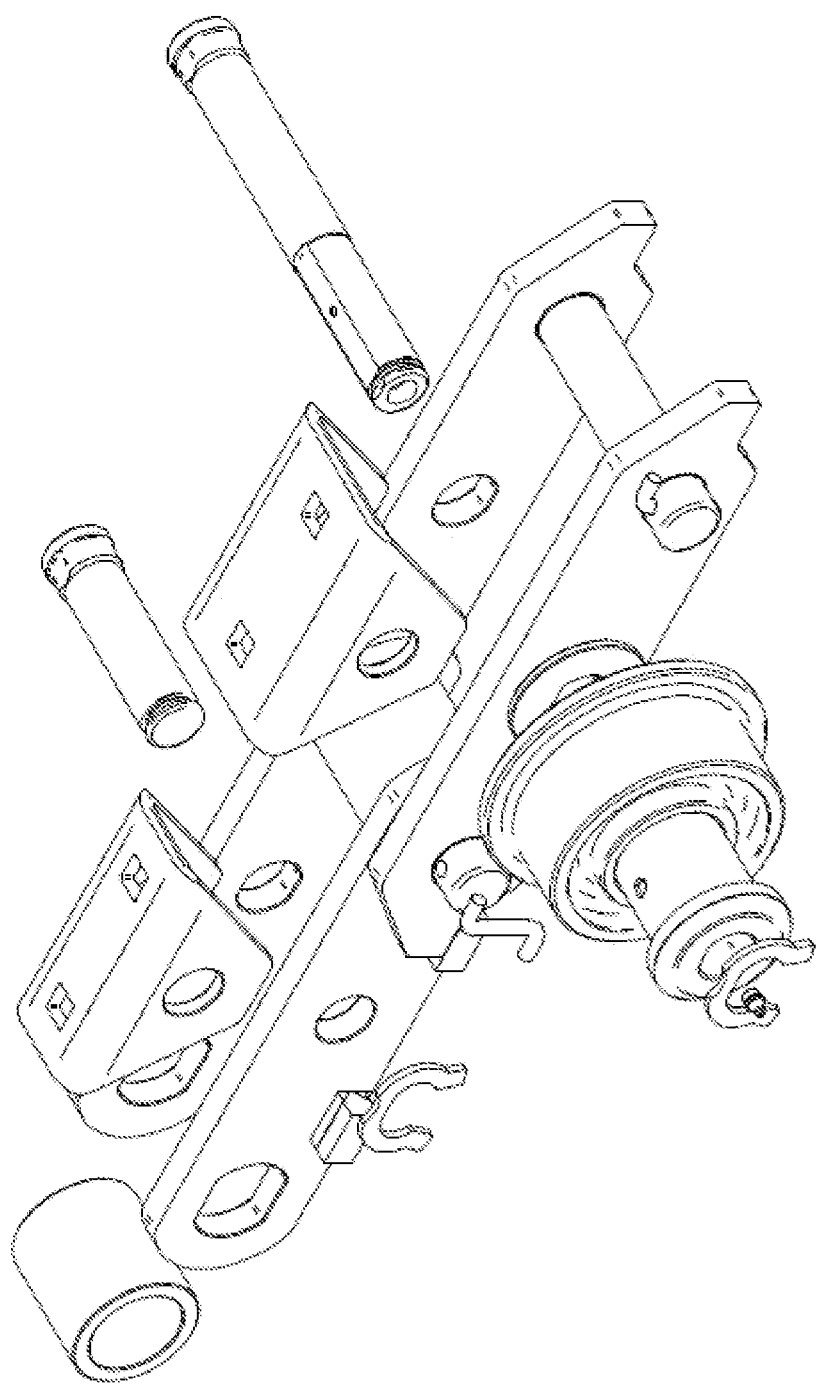
Figure 8:
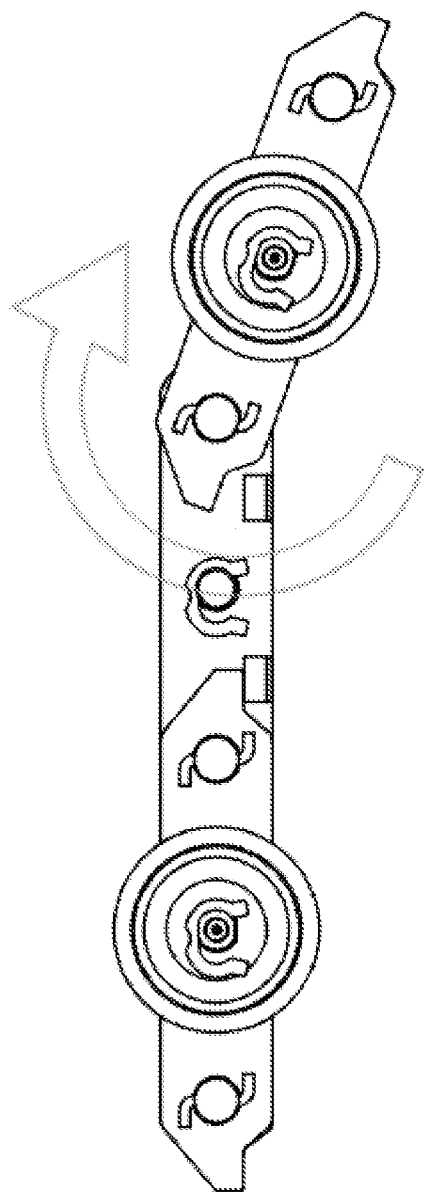
Figure 9:
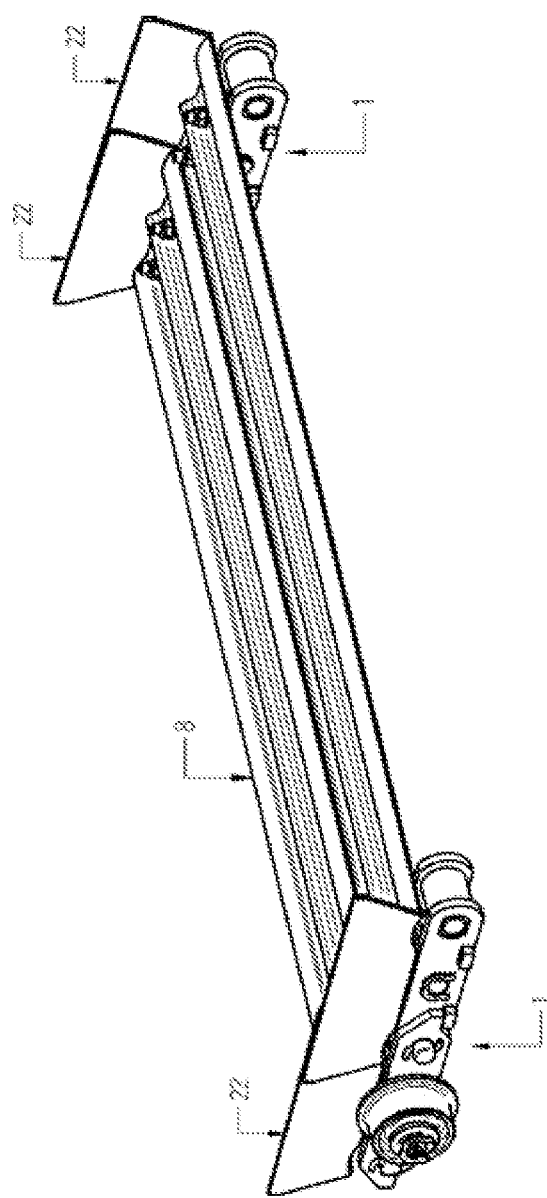
Figure 10:
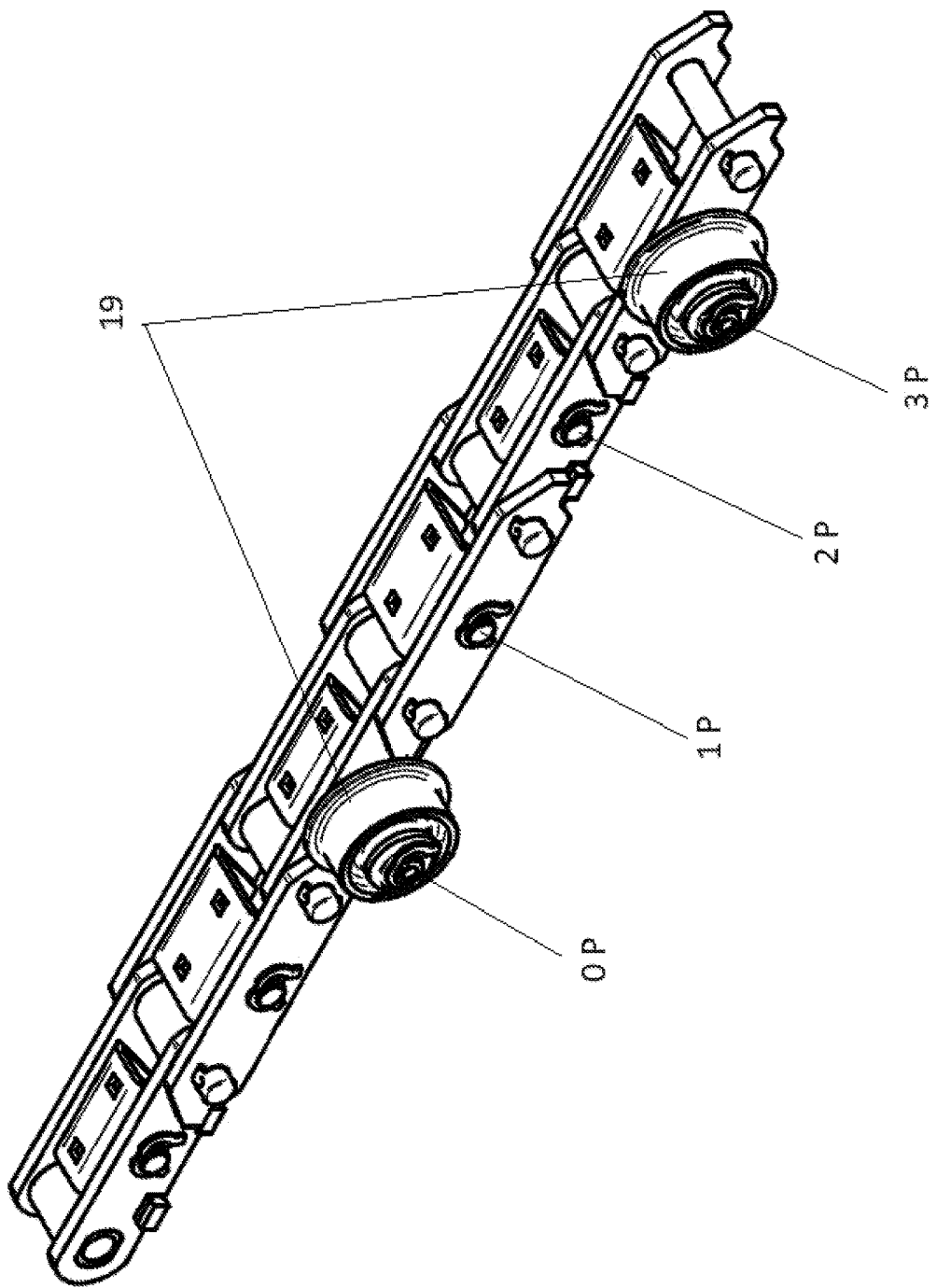

FIG. 7 corresponds to an exploded view of the chain mechanism;

FIG. 8 corresponds to a view that shows the free rotation direction of the chain;

FIG. 9 shows the detail of a complete transportation system that collects raw material from point "A" and transports, according to the direction of work, to point "B", where the discharge of the material is generated in the point where the system rotates by the traction sprocket; and FIG. 10 shows an alternative embodiment of the plate chain with a self-supporting mechanism, evidencing the arrangement of the outboard wheel every three steps, and indicating the context in which the steps are understood.

DETAILED DESCRIPTION

Embodiments of the present invention are directed to a plate engineering chain (1) characterized by comprising: a first group of links (2) made up of first or internal link plates (2a, 2b); a second group of links (3) made up of second or external link plates (3a, 3b); an outboard wheel (19); wherein the second group of links (3), includes a protruding support portion (31); wherein the first group of links (2) includes a block-type welded support (4); allowing the chain to support itself, while allowing the number of outboard wheels used to be reduced.

In the plate chain (1), the outboard wheels (19) are separated from each other by the first group of links (2), that is, these are mounted every two or three steps. In its every two-step configuration, the outboard wheels are mounted on the outer link group (3), while in its every three-step configuration the outboard wheels are mounted on the outer link group (3) and on the inner link group (2).

The first group of links (2) further comprises two bushings (12) each being non-rotatably connected with an interference fit with the first of a first inner link plate (2a) and the second of a first inner link plate (2b), these two bushings (12) also contain two rollers (13) that rotate freely on the bushings (12) and are laterally restrained by the first of a first internal link plate (2a) and the second of a first internal link plate (2b). Between first internal link plates, the bent plate support (7a) is located which is secured by the pin (14) complemented with a padlock-type fastening pin (15).

The second group of links (3) further comprises two pins (16) each of which is non-rotatably connected with an interference fit with the first outer link plate (3a) and the second outer link plate (3b) which are secured by pin type S (17). Between the second or external link plates (3a, 3b) the bent plate support (7b) is located, which is secured by the pin (18) with interference fit which in turn supports the outboard wheel (19), mounted on a forged bushing (20), separated from the plate by a spacer washer (21) and is complemented or secured with a padlock type retaining pin (15).

The plates that form the first group of links (2) and the second group of links (3) are flat plates, facilitating the production process.

In the context of embodiments of the present invention, the plate chain (1) must be assembled in pairs, joined together by transport (8), which in turn contains the containment side plates (22) that do not allow that the material to be transported can exit through the lateral part of the transport system. When multiple assemblies of this type are joined, a complete transportation system is created that collects raw material from point "A" and transports it according to the direction of work to point "B", where the unloading of the material is generated at the point where the system rotates by the traction sprocket (23).

All the links have a folded plate support (7a, 7b) to be a fixing means to a complementary support (8) that acts as a transport.

In one embodiment, the plate chain (1) with a self-supporting mechanism includes a transport means (8) with lateral containment plates (22).

In an embodiment, the transport (8) is formed of a slat or slat floor that is responsible for containing and transporting the raw material from one point to another and comprises a section of the assembly (9), in order to identify the connection element that has an alignment component (11) on the first group of links (2), the connection components can normally be described as screw, nut and washer, but these are not included in detail as they are not relevant to embodiments of the invention, the transport (8) contains in its standard construction 4 holes or alignment components (11) of which only 1 is described in the assembly section (9) and that are aligned in the construction or complete assembly of the pieces with the alignment components of the plate chairs (23a, 23b).

In one embodiment, the outboard wheel (19) includes a forged bushing (20) and a spacer washer (21).

The first plate of external links (3a) and the second plate of external links (3b) have a substantially trapezoidal geometry in which the protruding portion (31) forms a flat support face.

The first internal link plate (2a) and the second internal link plate (2b) have block-type welded stops (4).

It is then observed that, within the main advantages offered by embodiments of the invention, there are:

- The suppression of outboard wheels every two or three steps, by a self-supporting mechanism made from the rotation lock between the outer step plates and the inner step plates with welded stops.
- The possibility of the chain to rotate freely in the internal direction of transport. When the chain must rotate on the driving or driven sprockets, the operation is the same as that of a standard engineering chain, that is, the self-supporting mechanism does not restrict the normal movement path for its optimal operation.
- The possibility of the chain to generate a bridge between the outboard wheels configured every two or three steps of the chain, avoiding the generation of catenaries between the links that do not contain an outboard wheel, due to the developed configuration.
- The configuration of the chain allows to reduce the weight of the complete assembly approximately between 16 and 18%, allowing energy consumption to decrease in the equipment where it is implemented.
- The chain configuration has fewer components, therefore, the manufacturing cost is lower; the time required for manufacturing is less. Likewise, the maintainability of the chain and the consumption of supplies (greases, lubricants, among others) are reduced by up to 50%.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A plate chain comprising: a first group of links formed by internal link plates; a second group of links formed by external link plates; an outboard wheel; wherein the second group of links includes a protruding support portion; wherein the first group of links includes a block-type support that cooperates with the protruding support portion; wherein a first internal link plate and a second internal link plate have welded block-type stops.

2. The plate chain according to claim 1, wherein the first group of links further comprising two bushings each being non-rotatably connected with an interference fit with the internal link plates and the external link plates, the bushings also contain two rollers freely rotating on the bushings and being laterally restricted by the internal link plates; wherein, between the internal link plates there is a folded plate support secured by the pin and with the padlock-type fastening pin.

3. The plate chain according to claim 1, wherein the second group of links further comprising two pins each being non-rotatably connected with an interference fit with the plates, secured by an S-type pin, wherein, between the external link plates, a bent plate support is located, which is secured by the pin with interference fit that in turn supports the outboard wheel and is secured with a padlock-type fastening pin.

4. The plate chain according to claim 1, wherein the outboard wheel includes a forged bushing and a spacer washer.

5. The plate chain according to claim 1, wherein the plates forming the first group of links and the second group of links are flat plates.

6. The plate chain according to claim 1, wherein the groups of links have a folded plate support forming fixing elements to a transport.

7. The plate chain according to claim 1, wherein the outboard wheels are mounted every two steps.

8. The plate chain according to claim 1, wherein the outboard wheels are mounted every three steps.

9. The plate chain according to claim 6, wherein the transport includes lateral containment plates.

10. The plate chain according to claim 1, wherein the transport is formed by a slat or slat floor and comprises a mounting section with a connection element that has an alignment component on the link group.

11. The plate chain according to claim 1, wherein the first external link plate and the second external link plate have a substantially trapezoidal geometry where the protruding portion forms a flat support face.

12. A plate chain comprising: a first group of links formed by first link plates; a second group of links formed by second link plates; an outboard wheel; wherein the second group of links includes a protruding support portion; wherein the first group of links includes a block-type support that cooperates with the support portion;

wherein the first group of links further comprise two bushings each being non-rotatably connected with an interference fit with the first link plates and the second link plates, the bushings also contain two rollers freely rotating on the bushings and being laterally restricted by the first link plates; wherein, between the first link plates there is a folded plate support secured by the pin and with the padlock-type fastening pin.

13. A plate chain comprising: a first group of links formed by first link plates; a second group of links formed by second link plates; an outboard wheel; wherein the second group of links includes a protruding support portion; wherein the first group of links includes a block-type support that cooperates with the support portion;

wherein the second group of links further comprising two pins each being non-rotatably connected with an interference fit with the plates, secured by an S-type pin, wherein, between the second link plates, a bent plate support is located, which is secured by the pin with interference fit that in turn supports the outboard wheel and is secured with a padlock-type fastening pin.

* * * * *